United States Patent [19]
Nakasaki

[11] 3,980,119
[45] Sept. 14, 1976

[54] BIAS-PLY PNEUMATIC TIRES FOR MOTORCYCLES

[75] Inventor: Eiji Nakasaki, Kakogawa, Japan

[73] Assignee: Sumitomo Rubber Industries, Ltd., Kobe, Japan

[22] Filed: July 22, 1974

[21] Appl. No.: 490,388

[30] Foreign Application Priority Data
July 26, 1973  Japan.............................. 48-88890

[52] U.S. Cl........................... 152/354; 152/330 RF; 152/353 R; 152/374
[51] Int. Cl.²...................... B60C 9/10; B60C 17/00
[58] Field of Search ........... 152/196, 197, 198, 199, 152/200, 201, 202, 354, 355, 374, 330 RF, 209 R, 353 R

[56] References Cited
UNITED STATES PATENTS

| | | | |
|---|---|---|---|
| 1,007,018 | 10/1911 | Wilson et al........................ | 152/202 |
| 1,145,993 | 7/1915 | Hunter............................... | 152/202 |
| 1,261,013 | 4/1918 | Demas................................ | 152/202 |
| 1,410,704 | 3/1922 | Mitchell............................. | 152/202 |
| 2,786,507 | 3/1957 | Howe et al........................ | 152/198 X |

*Primary Examiner*—Drayton E. Hoffman
*Attorney, Agent, or Firm*—Stewart and Kolasch, Ltd.

[57] ABSTRACT

A bias-ply pneumatic tire for use in a motorcycle incorporating a textile cord carcass ply structure, which comprises at least one reinforcement layer of steel cord substantially forming a part of the carcass structure. The reinforcement layer is laid down on a bias at an angle within the range of 20° to 45° relative to the mid-circumferential plane of the tire. Both ends of the reinforcement layer terminate without being turned up around the respective bead cores nor secured thereto. The reinforcement layer may be positioned on the radially outermost surface of and/or between any adjacent pair of the textile cord plies of the carcass structure. In addition, the number of the reinforcement layer is not limited to one.

4 Claims, 3 Drawing Figures

BIAS-PLY PNEUMATIC TIRES FOR MOTORCYCLES

The present invention relates to vehicle tires and, more particularly, to bias-ply tires suited for use in motorcycles.

In most pneumatic tires heretofore manufactured for use in motorcycles, a bias-ply carcass is employed. It is well known that the bias-ply carcass comprises a plurality of layers of cords radially adjoining each other and alternately laid down at an angle, that is, a cord angle, of from 25° to 45° relative to the mid-circumferential plane of the tire. Each of the layers of cords is made of natural fiber or fibrous synthetic material including plyester, rayon, nylon, polyvinyl alcohol-type and other known fibers. Each of the carcass plies, that is, layers of cords, extends between the opposite bead portions of the tire with both ends thereof innerwardly turned up around the respective bead cores, a substantially intermediate portion thereof extending immediately below the tread of the tire.

In the case of the known bias-ply tire using an inner tube, the tire is provided for use after the inner tube has been inflated to attain a predetermined pneumatic pressure sufficient to support a load imposed on the inflated tire. Once puncture occurs during its use, the tire, so long as it is loaded, is rapidly crushed and if it is provided on to a motorcycle, the motorcycle accordingly falls down or otherwise no longer continues to run.

Accordingly, an essential object of the present invention is to provide an improved bias-ply tire for use in a motorcycle, wherein at least one reinforcement layer is provided separate of the carcass plies to improve the mechanical strength of the tire to an extent sufficient to cooperate with the air under pressure within the tire to support the load imposed on the tire. Thus, disadvantages inherent in conventional tires of similar construction are substantially eliminated.

Another object of the present invention is to provide an improved bias-ply tire of the type referred to above, which can be manufactured with no substantial difficulty due to the fact that both ends of the reinforcement layer within the tire terminate adjacent the respective bead cores without being connected to the latter.

According to the present invention, because of the presence of the reinforcement layer, even though puncture occurs in one tire during running of a motorcycle, the motorcycle can be driven at a predetermined speed to the nearest possible repair shop without substantially adversely affecting the punctured tire.

The presence of the reinforcement layer does not substantially reduce the performance characteristics of the tire, particularly its traction, tread life and cornering ability.

Moreover, because both ends of the reinforcement layer embedded in the tire of the present invention terminate at respective positions adjacent the bead cores without being secured to and turned up around the bead cores, manufacture thereof can be easily carried out with no substantial difficulty which may otherwise be encountered due to an extreme difference in modulus of any of the carcass layers or plies relative to the reinforcement layer.

The reinforcement layer embedded in the tire according to the present invention comprises a wired steel cord which may form a part of the bias-ply carcass and may, therefore, be disposed at a cord angle of from 20° to 45°, relative to the mid-circumferential plane of the tire.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Referring now to FIG. 1, it will be readily understood that the tire or tire cover 1 constructed in accordance with the present invention comprises a tread portion 2, a pair of sidewall portions 3 and 3' opposed to each other and contiguous to both sides of the tread portion 2, and a pair of bead portions 6 and 6' in which bead cores 7 and 7' are respectively embedded.

Figure 1:
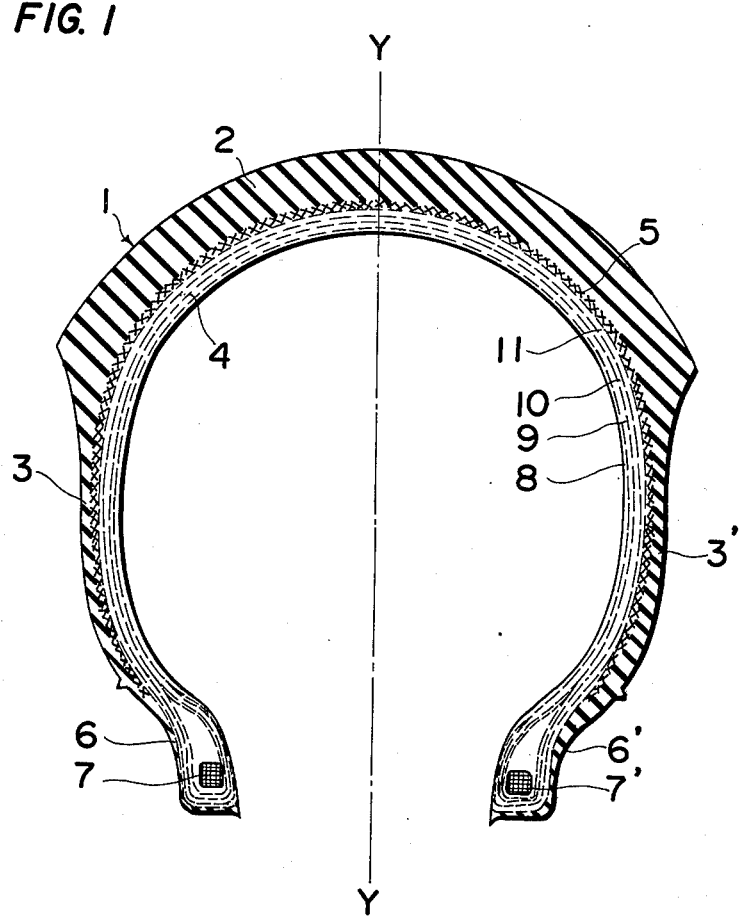
FIG. 1 shows a sectional view of a tire (with the inner tube removed) wherein the reinforcement layer is disposed between the tire and sidewall rubber and the radially outermost carcass ply.

The tire cover 1 also includes a bias-ply carcass 4 held in position to face the known inner tube (not shown). The bias-ply carcass 4 may be composed of at least one layer of cord of natural or synthetic fiber and, so far illustrated, it is shown as composed of four layers of polyester cord which are represented by carcass plies 8, 9, 10 and 11 adjoining to each other. The cords forming the carcass plies 8, 9, 10 and 11 are alternately laid down at a cord angle of from 25° to 45° relative to the mid-circumferential plane lying at right angles to the plane of the accompanying drawings, which mid-circumferential plane appears as a line Y—Y in the drawing because of cross-sectional representation.

Each of the carcass plies 8 to 11 extends between the bead portions 6 and 6' with both ends thereof innerwardly turned up around the respective bead cores 7 and 7' and secured in position within the bead portions 6 and 6', a substantially intermediate portion thereof extending immediately below the tread portion 2.

A reinforcement layer of steel cord, indicated by 5, is shown as embedded in between the tire and sidewall rubber and the radially outermost carcass ply 11 and has both ends terminating adjacent the respective boundaries between the bead portions 6 and 6' and the sidewall portions 3 and 3'.

Figure 2:
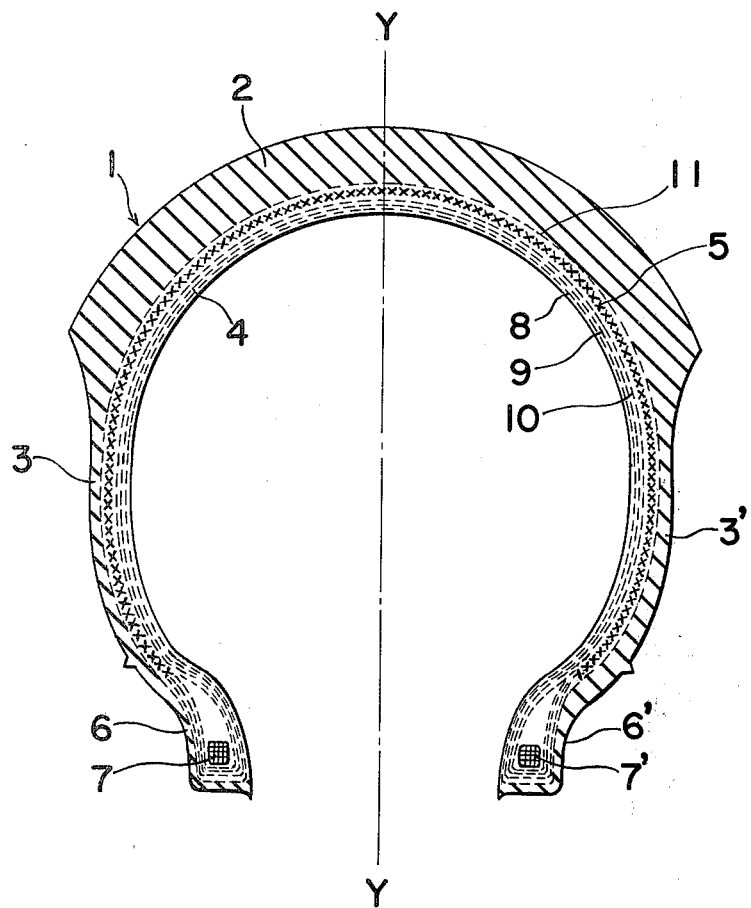
FIG. 2 is similar to FIG. 1 with the exception that the reinforcement layer is positioned between any adjacent pair of plies of textile cords.
Figure 3:
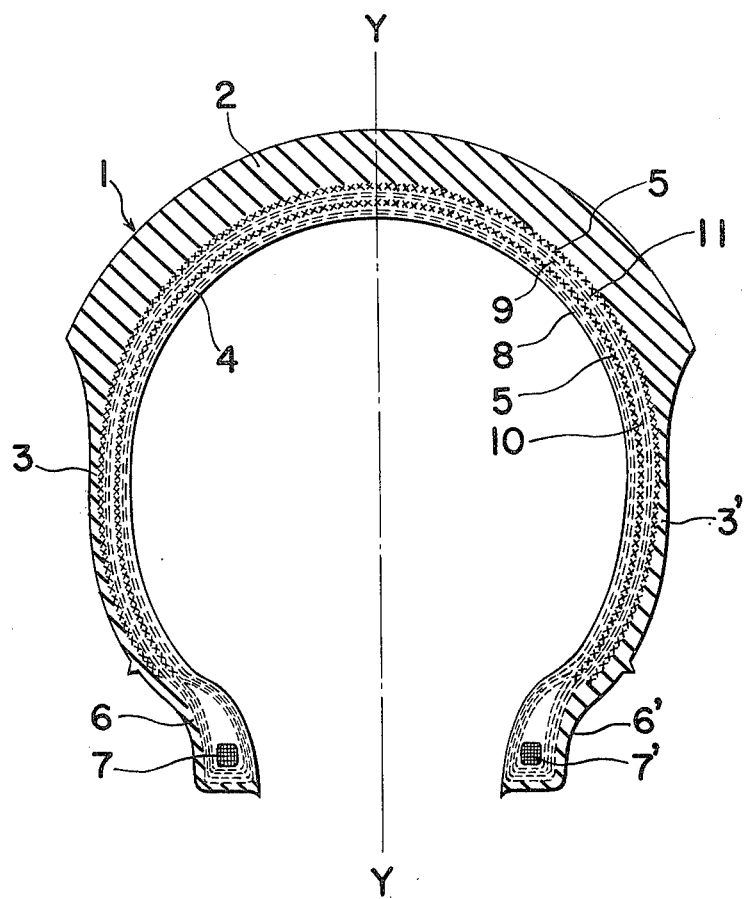
FIG. 3 is similar to FIG. 1 but showing the use of a plurality of reinforcement layers.

The number of the reinforcement layers of steel cord is not always limited to one as shown in FIG. 3, but may be two or more, in which case, while one reinforcement layer is positioned in between the tire and sidewall rubber and the radially outermost carcass ply 11 as shown, the other or others may be positioned in between the adjacent pair of carcass plies. Moreover, even though the single reinforcement layer 5 is employed such as shown, the position of the reinforcement layer 5 is not limited to the radially outside of the radially outermost carcass ply 11, but may be embedded in between any adjacent pair of the carcass plies 8 to 11 as shown in FIG. 2.

In any case, the steel cord forming the reinforcement layer 5 may have a cord angle within the range of from 20° to 45° relative to the mid-circumferential plane Y—Y, that is, may be laid down at an angle within range relative to that plane Y—Y.

In the practice of the present invention, a bias-ply tire, 4.00-18 in commercially standardized size representation, having four carcass plies of polyester cords, which were laid down on a bias at the cord angle of 30°, and a single reinforcement layer of steel cord which was laid down on a bias at a cord angle of 20° and positioned in between the tire and sidewall rubber and the radially outermost carcass ply, were manufactured. The bias-ply tire thus manufactured was subjected to two different tests of high speed steering stability and straight run as used on a motorcycle having a 180 kg payload.

During the test of high speed steering stability, the tire was inflated to attain a pneumatic pressure of 2.5 kg/cm$^2$. As a result, it has been found that the tire of the present invention withstood up to 160 km/hr.

During the straight run test, the tire of the present invention was not inflated so as to place it in a situation similar to where the tire has been punctured. As a result, it has been found that the same tire could be operated at 70 km/hr. for 25 minutes without substantially adversely affecting Thus, from the foregoing description, it has now become clear that the tire of the present invention is in fact durable so that, even though puncture occurs, the motorcycle equipped with the tire of the present invention can be driven at a reasonable speed to the nearest possible repair shop. It should, however, be noted that the concept of the present invention can be equally applicable to a tubeless, bias-ply tire.

Although the present invention has been fully described by way of example, it should be noted that various changes and modifications are apparent to those skilled in the art and, therefore, unless otherwise they depart from the true scope of the present invention, they should be understood as included therein.

What is claimed:

1. A pneumatic tire for use on a motorcycle, which comprises a tire cover made of a rubber material and having a tread portion, a pair of opposed sidewalls integrally extending from respective side edges of said tread portion, and a pair of opposed bead portions integrally extending from respective free ends of the individual sidewalls, said bead portions being adapted to firmly engage with associated rim flanges of a wheel rim, said tire cover including bead cores embedded respectively in said bead portions and a reinforcing structure for preventing the tire from collapsing when it is at least partially deflated which comprises a carcass structure embedded in said tire cover adjacent the inner surface thereof, said carcass structure having a plurality of piles of textile cords which are alternately disposed on a bias at an angle within the range of 25° to 45° relative to the mid-circumferential plane of the tire, said carcass structure having both ends turned up around the respective bead cores and secured in position adjacent the free ends of said sidewalls, and at least one reinforcement layer substantially forming a part of said carcass structure and made of a cord of steel material, said reinforcement layer being laid down on a bias at an angle within the range of from 20° to 40° relative to the mid-circumferential plane of the tire and having both ends terminating adjacent respective boundaries between the sidewalls and the bead portions without being turned up around the associated bead cores, said reinforcing structure representing the principal reinforcing portion of the tire.

2. A pneumatic tire as claimed in claim 1, wherein said reinforcement layer is positioned between said tire cover and sidewalls and said carcass structure and immediately above and in contact with the radially outermost one of said plurality of plies of textile cords.

3. A pneumatic tire as claimed in claim 1, wherein said reinforcement layer is position between any adjacent pair of said plurality of plies of textile cords.

4. A pneumatic tire as claimed in claim 2, further comprising an additional reinforcement layer of the same construction as said first-mentioned reinforcement layer, said additional reinforcement layer being positioned between any adjacent pair of said plurality of plies of textile cords and laid down on a bias at an angle within the range of 20° to 45° relative to the mid-circumferential plane of the tire.

* * * * *